(12) United States Patent
Kasahara et al.

(10) Patent No.: US 9,024,589 B2
(45) Date of Patent: May 5, 2015

(54) CHARGE/DISCHARGE CONTROL METHOD FOR ALKALINE STORAGE BATTERY, AND POWER SUPPLY SYSTEM

(75) Inventors: Takashi Kasahara, Osaka (JP); Kenta Tsutsui, Aichi (JP); Hideaki Ohyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 389 days.

(21) Appl. No.: 13/639,832

(22) PCT Filed: Dec. 22, 2011

(86) PCT No.: PCT/JP2011/007236
§ 371 (c)(1),
(2), (4) Date: Oct. 5, 2012

(87) PCT Pub. No.: WO2012/093459
PCT Pub. Date: Jul. 12, 2012

(65) Prior Publication Data
US 2013/0026996 A1 Jan. 31, 2013

(30) Foreign Application Priority Data
Jan. 6, 2011 (JP) .................................. 2011-001002

(51) Int. Cl.
*H02J 7/00* (2006.01)
*H01M 10/44* (2006.01)
(Continued)

(52) U.S. Cl.
CPC .............. *H01M 10/44* (2013.01); *B60L 3/0046* (2013.01); *B60L 11/1862* (2013.01);
(Continued)

(58) Field of Classification Search
CPC .............. B60L 3/0046; B60L 11/1862; B60L 2240/545; B60L 2240/547; B60L 11/126; B60L 2240/549; B60L 2240/80; Y02T 10/7005; Y02T 10/7044; Y02T 10/7077; Y02T 10/7241; Y02T 10/705; H01M 10/44

USPC .......................................................... 320/134
See application file for complete search history.

(56) References Cited

U.S. PATENT DOCUMENTS 6,204,636 B1 * 3/2001 Kinoshita et al. ............. 320/134
6,300,763 B1 10/2001 Kwok
(Continued)

FOREIGN PATENT DOCUMENTS

CN 1334631 A 2/2002
EP 1174977 A2 1/2002
(Continued)

OTHER PUBLICATIONS

Intetnational Search Reort issued in International Application No. PCT/JP2011/007236 issued on Apr. 3, 2012.
(Continued)

*Primary Examiner* — Jack Chiang
*Assistant Examiner* — Brandon Bowers
(74) *Attorney, Agent, or Firm* — McDermott Will Emery LLP

(57) ABSTRACT

A charge/discharge control method for an alkaline storage battery (11) includes: obtaining in advance a coefficient (K) representing characteristics of a memory effect of the alkaline storage battery; causing the alkaline storage battery to perform a charge/discharge between a lower-limit depth-of-charge (SOCb), of which a depth-of-charge is set within a range of 10% to 30%, and an upper-limit depth-of-charge (S), of which a depth-of-charge is set within a range of 70% to 90%; calculating an additional charge electricity quantity (C) based on the coefficient (K), the upper-limit depth-of-charge (S), and a predetermined reference time (T); measuring a charging/discharging time during which the alkaline storage battery performs the charge/discharge; and performing a charge of the alkaline storage battery with the calculated additional charge electricity quantity added to the upper-limit depth-of-charge, each time when the measured charging/discharging time reaches the reference time.

12 Claims, 4 Drawing Sheets

(51) Int. Cl.
  *B60L 3/00* (2006.01)
  *B60L 11/18* (2006.01)
  *H01M 10/48* (2006.01)
  *B60L 11/12* (2006.01)
  *H01M 10/24* (2006.01)
  *H01M 10/42* (2006.01)

(52) U.S. Cl.
  CPC ............ *H01M 10/24* (2013.01); *H02J 7/0029* (2013.01); *H02J 2007/0037* (2013.01); *H02J 2007/004* (2013.01); *H01M 10/48* (2013.01); *B60L 11/126* (2013.01); *B60L 11/1859* (2013.01); *B60L 2210/40* (2013.01); *B60L 2240/545* (2013.01); *B60L 2240/547* (2013.01); *B60L 2240/549* (2013.01); *B60L 2240/80* (2013.01); *Y02T 10/7077* (2013.01); *Y02T 10/7044* (2013.01); *Y02T 10/7005* (2013.01); *Y02T 10/705* (2013.01); *Y02T 10/7241* (2013.01); *Y02T 10/6217* (2013.01); *H01M 10/4242* (2013.01)

(56) References Cited

U.S. PATENT DOCUMENTS

| | | | |
|---|---|---|---|
| 6,465,988 | B2 | 10/2002 | Ito et al. |
| 8,022,674 | B2 * | 9/2011 | Miura ........................ 320/132 |
| 2001/0035742 | A1 | 11/2001 | Ito et al. |

FOREIGN PATENT DOCUMENTS

| | | |
|---|---|---|
| JP | 2001-069608 A | 3/2001 |
| JP | 2001-314041 A | 11/2001 |
| JP | 2004-022322 A | 1/2004 |
| JP | 2004-166350 A | 6/2004 |
| JP | 2005-065352 A | 3/2005 |
| JP | 2007-104803 A | 4/2007 |
| JP | 2009-017733 A | 1/2009 |

OTHER PUBLICATIONS

Extended European Search Report issued in EP11854828.8, dated Oct. 31, 2014.

* cited by examiner

FIG. 5

| | CONDITIONS OF ADDITIONAL CHARGE | | | MEMORY EFFECT | ELECTROLYTE LEAKAGE | SHELF TEST |
|---|---|---|---|---|---|---|
| | CURRENT VALUE | ELECTRICITY QUANTITY | FREQUENCY | | | |
| EXAMPLE 1 | 30 A | 1 Ah | EVERY 100 HOURS | ABSENT | ABSENT | ABSENT |
| EXAMPLE 2 | 6 A | 1 Ah | EVERY 100 HOURS | PRESENT | ABSENT | ABSENT |
| EXAMPLE 3 | 15 A | 1 Ah | EVERY 100 HOURS | PRESENT | ABSENT | ABSENT |
| EXAMPLE 4 | 18 A | 1 Ah | EVERY 100 HOURS | ABSENT | ABSENT | ABSENT |
| EXAMPLE 5 | 60 A | 1 Ah | EVERY 100 HOURS | ABSENT | ABSENT | ABSENT |
| EXAMPLE 6 | 90 A | 1 Ah | EVERY 100 HOURS | ABSENT | ABSENT | ABSENT |
| EXAMPLE 7 | 100 A | 1 Ah | EVERY 100 HOURS | ABSENT | PRESENT | ABSENT |
| EXAMPLE 8 | 120 A | 1 Ah | EVERY 100 HOURS | ABSENT | PRESENT | ABSENT |
| EXAMPLE 9 | 30 A | 1 Ah | EVERY 30 HOURS | ABSENT | ABSENT | SIGNIFICANT |
| EXAMPLE 10 | 30 A | 1 Ah | EVERY 50 HOURS | ABSENT | ABSENT | PRESENT |
| EXAMPLE 11 | 30 A | 1 Ah | EVERY 70 HOURS | ABSENT | ABSENT | ABSENT |
| EXAMPLE 12 | 30 A | 1 Ah | EVERY 150 HOURS | ABSENT | ABSENT | ABSENT |
| EXAMPLE 13 | 30 A | 1 Ah | EVERY 200 HOURS | ABSENT | ABSENT | ABSENT |
| EXAMPLE 14 | 30 A | 1 Ah | EVERY 220 HOURS | PRESENT | ABSENT | ABSENT |
| EXAMPLE 15 | 30 A | 1 Ah | EVERY 300 HOURS | PRESENT | ABSENT | ABSENT |
| COMPARATIVE EXAMPLE 1 | NO ADDITIONAL CHARGE | NO ADDITIONAL CHARGE | NO ADDITIONAL CHARGE | SIGNIFICANT | ABSENT | ABSENT |
| COMPARATIVE EXAMPLE 2 | 30 A | 0.5 Ah | EVERY 100 HOURS | SIGNIFICANT | ABSENT | ABSENT |
| COMPARATIVE EXAMPLE 3 | 30 A | 1.5 Ah | EVERY 100 HOURS | ABSENT | SIGNIFICANT | ABSENT |

CHARGE/DISCHARGE CONTROL METHOD FOR ALKALINE STORAGE BATTERY, AND POWER SUPPLY SYSTEM

RELATED APPLICATIONS

This application is the U.S. National Phase under 35 U.S.C. §371 of International Application No. PCT/JP2011/007236, filed on Dec. 22, 2011, which in turn claims the benefit of Japanese Application No. 2011-001002, filed on Jan. 6, 2011, the disclosures of which Applications are incorporated by reference herein.

TECHNICAL FIELD

The present invention relates to a charge/discharge control method for an alkaline storage battery, and a power supply system, and more specifically to a technology for preventing the occurrence of the memory effect.

BACKGROUND ART

Alkaline storage batteries, including nickel-hydrogen storage batteries, are used in a wide range of areas such as hybrid automobile (referred to as "HEV," hereinafter) applications and industrial applications (e.g., a backup power). Especially in the HEV application, an alkaline storage battery functioning as a main power supply performs a motor driving (discharge) and accumulation (charge) of regenerative power from a generator. Therefore, the state of charge (SOC) of the battery is monitored and controlled. The above state of charge is also referred to as "depth-of-charge", and is defined, in numerical terms, as 100% when the battery is fully charged and as 0% when the battery is fully discharged.

When the alkaline storage battery that uses nickel hydroxide as a positive electrode active material repeatedly performs a so-called partial charge/discharge cycle in which a full discharge (SOC is almost 0%) or full charge (SOC is almost 100%) is not performed, a phenomenon (referred to as "memory effect" hereinafter) in which the electromotive force with respect to the residual capacity of the alkaline storage battery decreases, and the capacity of the alkaline storage battery decreases occurs. In order to avoid the memory effect, it is desired that charge and discharge are performed in a wide SOC range in the alkaline storage battery.

However, a plurality of alkaline storage batteries are used in a power supply system for the HEV application in which charge/discharge is constantly and instantly performed with a large current. The capacities of the plurality of alkaline storage batteries vary. In order to prevent the alkaline storage battery with the lowest capacity from being overcharged or overdischarged, an upper-limit depth-of-charge (SOCt) and a lower-limit depth-of-charge (SOCb) are provided, the upper-limit depth-of-charge (SOCt) being set for prohibiting charging the battery to a level equal to or higher than its SOC, and the lower-limit depth-of-charge (SOCb) being set for prohibiting discharging the battery to a level equal to or lower than its SOC, and a method is used in which charge/discharge of the battery is controlled between the SOCt and SOCb. More specifically, the SOCt is set at SOC 70% to SOC 90% and the SOCb is set at SOC 10% to SOC 30% generally. The alkaline storage batteries for the HEV application are mainly used in an intermediate SOC region and are repeatedly charged/discharged on the condition that a full charge or full discharge is not performed. For this reason, the memory effect is easy to take place, so a variety of technologies have been proposed in order to resolve the memory effect.

Patent Document 1, for example, proposes a technology which, when the memory effect is detected, resolves the memory effect by bringing an upper limit value or a lower limit value of an SOC control range close to a full charge level or a full discharge level.

Patent Documents 2 and 3 each propose a battery control device that controls to change an upper limit value or a lower limit value of an SOC of charge and discharge of a secondary battery to prevent the occurrence of the memory effect.

However, the battery control device described in above Patent Document 1 brings the upper limit value or lower limit value of the predetermined SOC control range close to a full charge level or a full discharge level, to thereby resolve the memory effect after the memory effect is detected. Thus, a long time to resolve the memory effect is required. Moreover, if the memory effect that has occurred is significant, the above-described process might not be enough to resolve the memory effect.

The technologies disclosed in Patent Documents 2 and 3 repeatedly charge/discharge their batteries evenly in an SOC region within a prescribed range by fluctuating the upper limit value or the lower limit value of the SOC. Therefore, the technologies disclosed in Patent Documents 2 and 3 have the effect of preventing the occurrence of the memory effect. However, it is difficult for these technologies to completely resolve the memory effect because the SOC is not brought close to a full charge level or a full discharge level.

Patent Document 1: Japanese Patent Application Publication No. 2001-69608
Patent Document 2: Japanese Patent Application Publication No. 2004-166350
Patent Document 3: Japanese Patent Application Publication No. 2007-104803

SUMMARY OF THE INVENTION

The present invention was contrived in view of the problems described above, and an object thereof is to provide a charge/discharge control method for an alkaline storage battery, and a power supply system, which are capable of preventing the occurrence of the memory effect.

A charge/discharge control method for an alkaline storage battery according to one aspect of the present invention includes: obtaining in advance a coefficient representing characteristics of a memory effect of the alkaline storage battery; causing the alkaline storage battery to perform a charge/discharge between a lower-limit depth-of-charge, of which a depth-of-charge is set within a range of 10% to 30%, and an upper-limit depth-of-charge, of which a depth-of-charge is set within a range of 70% to 90%; calculating an additional charge electricity quantity based on the coefficient, the upper-limit depth-of-charge, and a predetermined reference time; measuring a charging/discharging time during which the alkaline storage battery performs the charge/discharge; and performing a charge of the alkaline storage battery with the calculated additional charge electricity quantity added to the upper-limit depth-of-charge, each time when the measured charging/discharging time reaches the reference time.

A power supply system according to another aspect of the present invention has: a power source unit that includes an alkaline storage battery; a first calculator that calculates a depth-of-charge of the power source unit; a charge/discharge controller that causes the power source unit to perform a charge/discharge between a lower-limit depth-of-charge, of which a depth-of-charge is predetermined within a range of 10% to 30%, and an upper-limit depth-of-charge, of which a depth-of-charge is predetermined within a range of 70% to 90%, based on the depth-of-charge of the power source unit calculated by the first calculator; a storage unit in which a coefficient representing characteristics of a memory effect of the alkaline storage battery included in the power source unit and a predetermined reference time are stored in advance; a timer unit that measures a charging/discharging time during which the alkaline storage battery performs the charge/discharge; and a second calculator that calculates an additional charge electricity quantity based on the coefficient stored in the storage unit, the predetermined upper-limit depth-of-charge, and the reference time stored in the storage unit, wherein the charge/discharge controller performs a charge of the power source unit with the additional charge electricity quantity, which is calculated by the second calculator, added to the upper-limit depth-of-charge, each time when the charging/discharging time measured by the timer unit reaches the reference time.

BRIEF DESCRIPTION OF THE DRAWINGS

FIG. 5 is a drawing showing, in a tabular form, results of examples and comparative examples.

DESCRIPTION OF EMBODIMENTS

An embodiment for implementing the present invention is described hereinafter.

Figure 1:
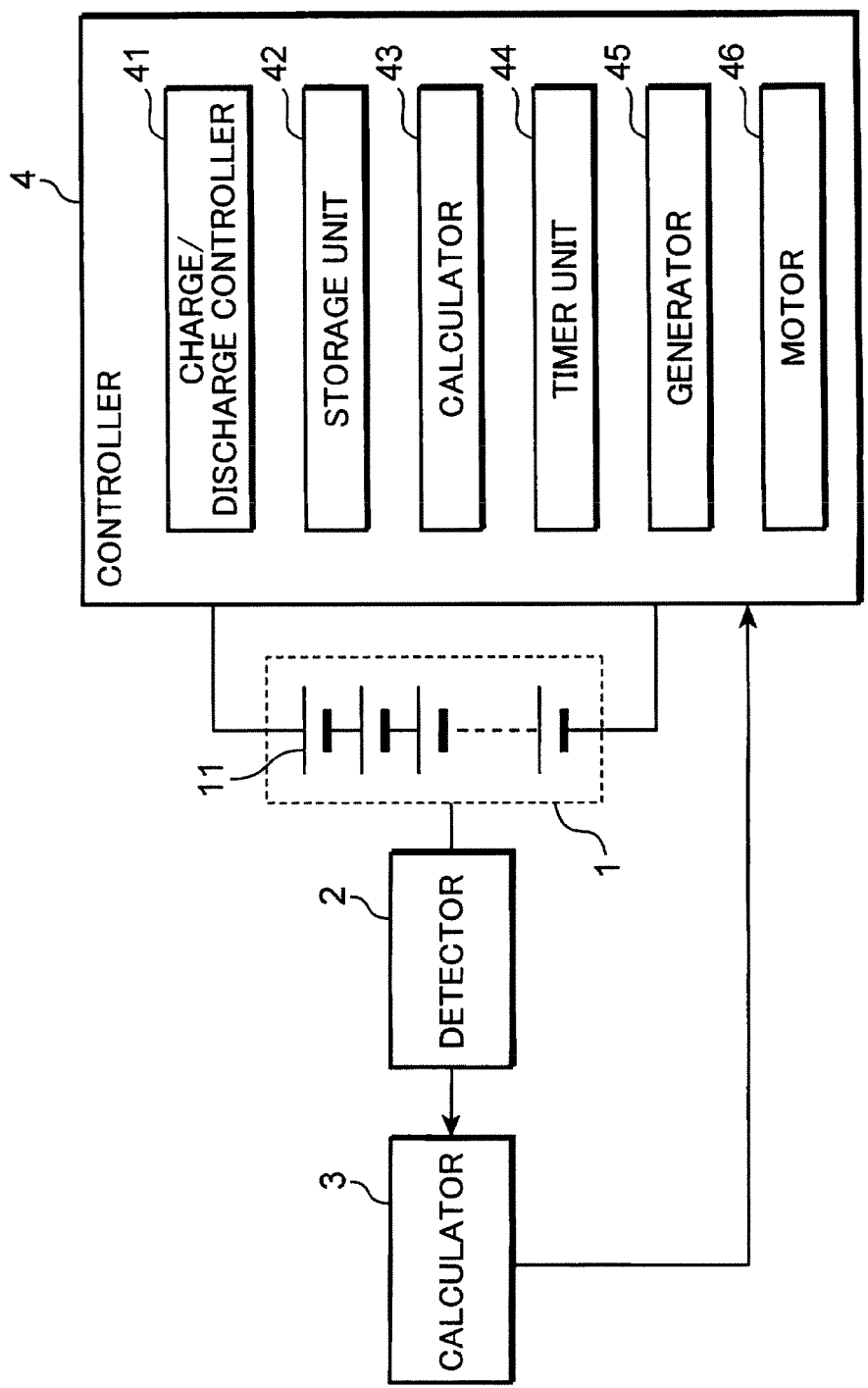
FIG. 1 is a block diagram showing an embodiment of a power supply system according to the present invention.
Figure 2:
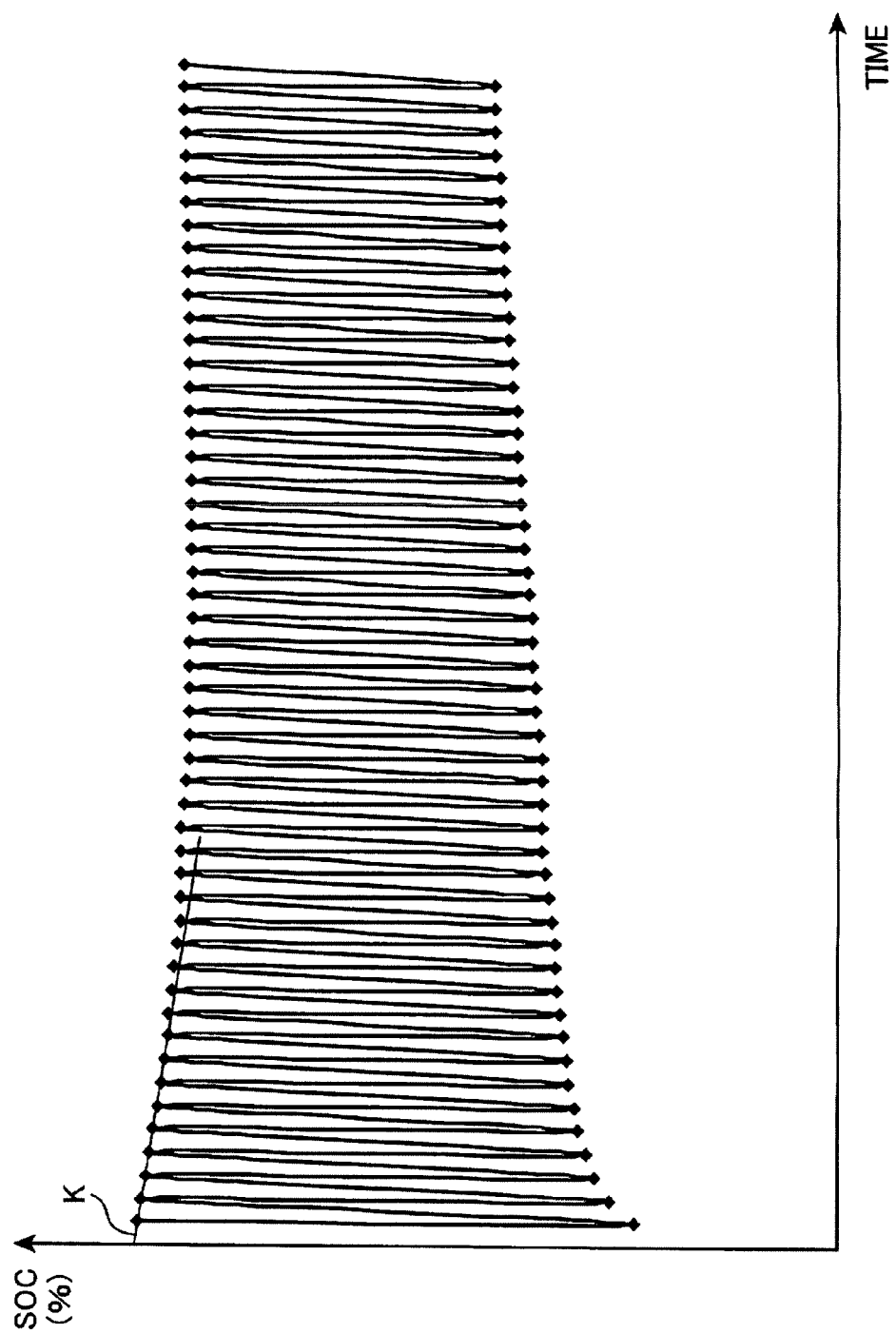
FIG. 2 is a diagram showing an example of the characteristics of an alkaline storage battery used in the power supply system shown in FIG. 1.

FIG. 1 is a block diagram showing an embodiment of a power supply system according to the present invention. FIG. 2 is a diagram showing an example of the characteristics of an alkaline storage battery used in the power supply system shown in FIG. 1. The power supply system shown in FIG. 1 is a power supply system for an HEV for example in the present embodiment, and has a power source unit 1, a detector 2, a calculator 3, and a controller 4.

The power source unit 1 includes a plurality of series-connected alkaline storage batteries 11. Nickel-hydrogen storage batteries, for example in the present embodiment, are used as the alkaline storage batteries 11. In place of the nickel-hydrogen storage batteries, nickel-cadmium storage batteries, for example, may be used. The detector 2 detects a battery voltage, a current value for charge/discharge, and a battery temperature of the power source unit 1. The calculator 3 calculates an SOC value of the power source unit 1 based on the battery voltage, the charge/discharge current value, and the battery temperature detected by the detector 2.

The controller 4 has a charge/discharge controller 41, a storage unit 42, a calculator 43, a timer unit 44, a generator 45, and a motor 46. The charge/discharge controller 41 controls charge/discharge of the power source unit 1 based on the SOC value of the power source unit 1 calculated by the calculator 3, such that an SOC of the power source unit 1 changes between a lower-limit depth-of-charge SOCb and an upper-limit depth-of-charge SOCt. The charge/discharge controller 41 sets the lower-limit depth-of-charge SOCb within a range of SOC 10% to SOC 30%. In the present embodiment, the charge/discharge controller 41 sets the lower-limit depth-of-charge SOCb at, for example, SOC 20%. The charge/discharge controller 41 sets the upper-limit depth-of-charge SOCt within a range of SOC 70% to SOC 90%. In the present embodiment, the charge/discharge controller 41 sets the upper-limit depth-of-charge SOCt at, for example, SOC 80%. Functions of the charge/discharge controller 41 are further described hereinafter.

The storage unit 42 stores a preset reference time T therein. In the present embodiment, the reference time T is determined in advance within a range of, for example, 70 to 200 hours in accordance with the characteristics of the alkaline storage batteries 11. The storage unit 42 also stores a previously obtained coefficient K therein. As described above, when the alkaline storage batteries 11 repeatedly perform charge/discharge without fully charging or discharging, the memory effect in which the battery capacity is reduced occurs. FIG. 2 shows this memory effect. As shown in FIG. 2, the coefficient K is a reduction width of an SOC per unit time in the charge-side (upper-limit side, in FIG. 2) and is represented in a unit of [%/time]. In other words, the coefficient K represents the characteristics of the memory effect of the alkaline storage batteries 11. As shown in FIG. 2, the above coefficient K is obtained in advance based on the characteristics of the alkaline storage batteries 11 and stored in the storage unit 42.

The calculator 43 calculates an additional charge electricity quantity on the basis of the coefficient K stored in the storage unit 42, the upper-limit depth-of-charge SOCt, and the reference time T stored in the storage unit 42. The calculator 43 calculates the additional charge electricity quantity C using the following expression:

$$C = 100 - (S - KT) \quad (1)$$

where S represents the upper-limit depth-of-charge SOCt and C represents the additional charge electricity quantity. The additional charge electricity quantity C is expressed in percent of an initial full charge capacity of each alkaline storage battery 11.

In the expression (1) above, (S−KT) corresponds to the charge-side (upper-limit side, in FIG. 2) depth-of-charge SOC obtained when the reference time T elapses. This (S−KT) is set as follows:

$$60 < (S - KT) < 90 \quad (2)$$

In other words, the coefficient K is determined in advance in accordance with the characteristics of the alkaline storage batteries 11, as described above. Therefore, the upper-limit depth-of-charge S and the reference time T are determined so as to satisfy the expression (2) described above, in consideration of the coefficient K determined in advance.

Further, in the expression (1) described above, the additional charge electricity quantity C is set as follows:

$$C \leq 20 \quad (3)$$

In other words, even when the result of calculating the additional charge electricity quantity C using the expression (1) exceeds 20%, an upper limit value thereof is set at C=20%. By setting the upper limit value of the additional charge electricity quantity C in this manner, the alkaline storage batteries 11 is prevented from being overcharged by the additional charge electricity quantity C.

The timer unit 44 measures a charging/discharging time during which the power source unit 1 performs charge/discharge under control of the charge/discharge controller 41. The timer unit 44 may measure the time at which the charge/discharge current value detected by the detector 2 is equal to or greater than 1 mA, as the charging/discharging time. In other words, when the charge/discharge current value is less than 1 mA, the timer unit 44 may determine that the charge/discharge is not performed and may not measure the charging/discharging time at this time. Then, the charge/discharge controller 41 adds the additional charge electricity quantity C calculated by the calculator 43 to the upper-limit depth-of-charge SOCt to perform additional charge of the power source unit 1, each time when the charging/discharging time measured by the timer unit 44 reaches the reference time T. The charge/discharge controller 41 performs the additional charge at a current value that is determined in advance within a range of 3 It to 15 It in accordance with the characteristics of the alkaline storage batteries 11.

The charge/discharge controller 41 charges the power source unit 1 by using regenerative power obtained from the generator 45. The power supply system of the present embodiment is for the HEV application and therefore generally uses, as the generator 45, an inverter that is capable of converting kinetic energy of an internal combustion energy or frictional energy obtained when the vehicle stops, into a charging current. The charge/discharge controller 41 also discharges the power source unit 1 by supplying power to the motor 46. Note that it is efficient to use this inverter to convert electric energy into kinetic energy when discharging the power source unit 1. In the present embodiment, the calculator 3 corresponds to an example of a first calculator, and the calculator 43 corresponds to an example of a second calculator.

Figure 3:
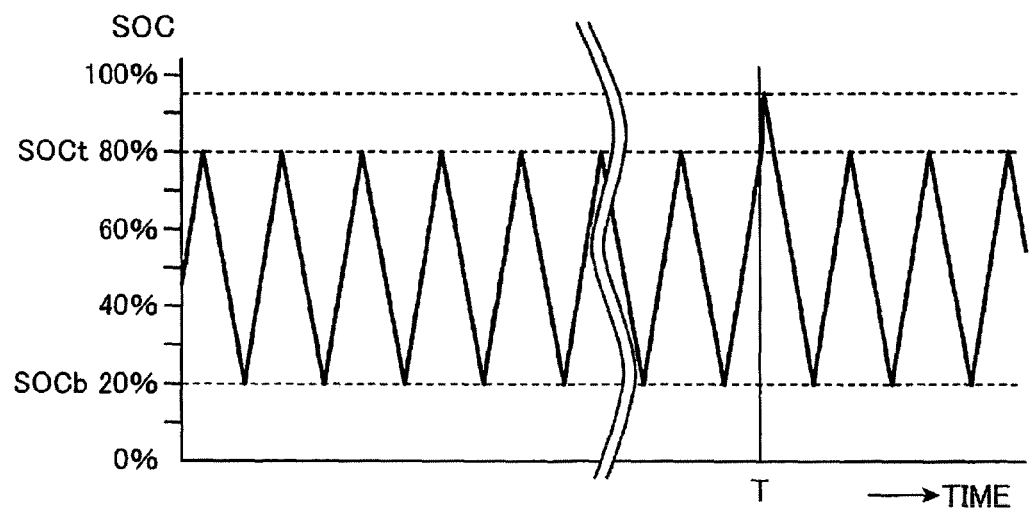
FIG. 3 is a schematic diagram showing an example of charge/discharge control carried out in the present embodiment.
Figure 4:
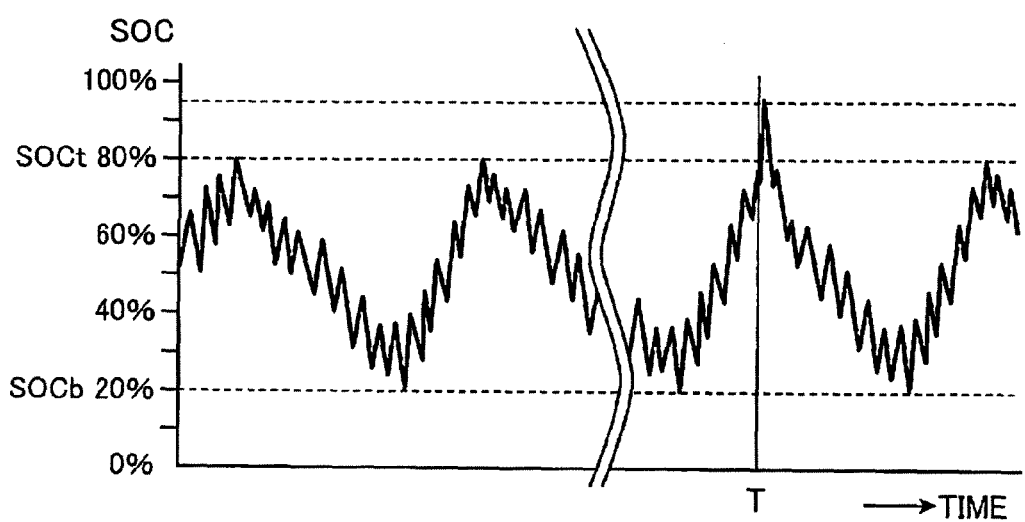
FIG. 4 is a schematic diagram showing another example of the charge/discharge control carried out in the present embodiment.

FIG. 3 is a schematic diagram showing an example of charge/discharge control carried out in the present embodiment. FIG. 4 is a schematic diagram showing another example of the charge/discharge control carried out in the present embodiment. In FIG. 3, the lower-limit depth-of-charge SOCb is set at SOC 20%, and the upper-limit depth-of-charge SOCt is set at SOC 80%. The additional charge electricity quantity (the electricity quantity equivalent to 15% of the battery capacity in FIG. 3) is added to the upper-limit depth-of-charge SOCt to perform the additional charge, each time when a cumulative total of time spent as a result of repeating the charge/discharge at a constant current reaches the above reference time T. The memory effect, which is the problem of the alkaline storage batteries 11, can be prevented and the power supply system can be operated efficiently, by regularly carrying out an operation of charging the alkaline storage batteries 11 almost fully each time when the cumulative total obtained as a result of repeating the charge/discharge in the intermediate SOC region reaches the reference time T.

As shown in FIG. 4, between the lower-limit depth-of-charge SOCb and the upper-limit depth-of-charge SOCt, the charge/discharge in the intermediate SOC region may be continued, with the charge/discharge that exhibits small amplitude fluctuation being repeated intensely within a short period of time. In the alkaline storage batteries 11 for the HEV application according to the present embodiment, generally regenerative charge and discharge are repeated irregularly within a short period of time and continued, with the control being implemented between the SOCb and the SOCt.

The specific embodiment described above mainly includes the inventions having the following configurations.

A charge/discharge control method for an alkaline storage battery according to one aspect of the present invention includes: obtaining in advance a coefficient representing characteristics of a memory effect of the alkaline storage battery; causing the alkaline storage battery to perform a charge/discharge between a lower-limit depth-of-charge, of which a depth-of-charge is set within a range of 10% to 30%, and an upper-limit depth-of-charge, of which a depth-of-charge is set within a range of 70% to 90%; calculating an additional charge electricity quantity based on the coefficient, the upper-limit depth-of-charge, and a predetermined reference time; measuring a charging/discharging time during which the alkaline storage battery performs the charge/discharge; and performing a charge of the alkaline storage battery with the calculated additional charge electricity quantity added to the upper-limit depth-of-charge, each time when the measured charging/discharging time reaches the reference time.

According to this configuration, the coefficient representing the characteristics of the memory effect of the alkaline storage battery is obtained in advance. The alkaline storage battery is caused to perform a charge/discharge between the lower-limit depth-of-charge, of which a depth-of-charge is set within a range of 10% to 30%, and the upper-limit depth-of-charge, of which a depth-of-charge is set within a range of 70% to 90%. The additional charge electricity quantity is calculated based on the coefficient, the upper-limit depth-of-charge, and the predetermined reference time. The charging/discharging time during which the alkaline storage battery performs the charge/discharge is measured. A charge of the alkaline storage battery is performed with the calculated additional charge electricity quantity added to the upper-limit depth-of-charge, each time when the measured charging/discharging time reaches the reference time. Therefore, the alkaline storage battery can be almost completely charged without being overcharged, before the memory effect produces significant effects thereon. Thus, it becomes possible to efficiently resolve the memory effect.

In the charge/discharge control method for the alkaline storage battery, it is preferred that the additional charge electricity quantity be calculated by using an expression, $C=100-(S-KT)$, where K represents the coefficient, S represents the upper-limit depth-of-charge, T represents the reference time, and C represents the additional charge electricity quantity.

According to this configuration, the additional charge electricity quantity is calculated by using the expression, $C=100-(S-KT)$, where K represents the coefficient, S represents the upper-limit depth-of-charge, T represents the reference time, and C represents the additional charge electricity quantity. Therefore, the additional charge electricity quantity can favorably be obtained based on the coefficient, the upper-limit depth-of-charge, and the reference time.

Furthermore, in the charge/discharge control method for the alkaline storage battery, it is preferred that the upper-limit depth-of-charge S and the reference time T be determined so as to satisfy an inequation, $60<(S-KT)<90$. According to this configuration, the upper-limit depth-of-charge S and the reference time T are determined so as to satisfy an inequation, $60<(S-KT)<90$. $(S-KT)$ corresponds to the depth-of-charge when the additional charge is performed. Therefore, the depth-of-charge when performing the additional charge can be prevented from becoming equal to or greater than 90% or equal to or lower than 60%, so that the additional charge can be carried out at an appropriate depth-of-charge.

In the charge/discharge control method for the alkaline storage battery, it is preferred that an upper limit of the additional charge electricity quantity be set at 20% of a battery capacity of the alkaline storage battery. According to this configuration, the upper limit of the additional charge electricity quantity is set at 20% of the battery capacity of the alkaline storage battery. Thus, the alkaline storage battery can be prevented from being overcharged by the additional charge electricity quantity.

In the charge/discharge control method for the alkaline storage battery, it is preferred that the reference time be set within a range of 70 to 200 hours and be set at a time in accordance with the characteristics of the memory effect of the alkaline storage battery.

According to this configuration, the reference time is set within the range of 70 to 200 hours and is set at time in accordance with the characteristics of the memory effect of the alkaline storage battery. When a time interval in which the additional charge is performed is less than 70 hours, the alkaline storage battery is overcharged. Thus, the deterioration of the alkaline storage battery is accelerated and the life of the alkaline storage battery is reduced. Further, when the time interval in which the additional charge is performed exceeds 200 hours, the additional charge becomes insufficient, and the effect of resolving the memory effect cannot be exerted fully. Therefore, the above configuration can perform the additional charge in a favorable time interval.

In the charge/discharge control method for the alkaline storage battery, it is preferred that the additional charge be performed at a current value set within a range of 3 It to 15 It.

According to this configuration, the additional charge is performed at the current value set within the range of 3 It to 15 It. Charging at a small current of less than 3 It causes a small change in the battery voltage and reduces the effect of resolving the memory effect. Charging at a large current exceeding 15 It increases an inner pressure of the alkaline storage battery, increasing the risk of liquid leakage in the alkaline storage battery. The above configuration, therefore, can favorably perform the additional charge.

A power supply system according to another aspect of the present invention includes: a power source unit that includes an alkaline storage battery; a first calculator that calculates a depth-of-charge of the power source unit; a charge/discharge controller that causes the power source unit to perform a charge/discharge between a lower-limit depth-of-charge, of which a depth-of-charge is predetermined within a range of 10% to 30%, and an upper-limit depth-of-charge, of which a depth-of-charge is predetermined within a range of 70% to 90%, based on the depth-of-charge of the power source unit calculated by the first calculator; a storage unit in which a coefficient representing characteristics of a memory effect of the alkaline storage battery included in the power source unit and a predetermined reference time are stored in advance; a timer unit that measures a charging/discharging time during which the alkaline storage battery performs the charge/discharge; and a second calculator that calculates an additional charge electricity quantity based on the coefficient stored in the storage unit, the predetermined upper-limit depth-of-charge, and the reference time stored in the storage unit, wherein the charge/discharge controller performs a charge of the power source unit with the additional charge electricity quantity, which is calculated by the second calculator, added to the upper-limit depth-of-charge, each time when the charging/discharging time measured by the timer unit reaches the reference time.

According to this configuration, the power source unit includes an alkaline storage battery. The first calculator calculates the depth-of-charge of the power source unit. The charge/discharge controller causes the power source unit to perform a charge/discharge between the lower-limit depth-of-charge, of which the depth-of-charge is predetermined within the range of 10% to 30%, and the upper-limit depth-of-charge, of which the depth-of-charge is predetermined within the range of 70% to 90%, based on the depth-of-charge of the power source unit calculated by the first calculator. The storage unit stores therein in advance the coefficient representing the characteristics of the memory effect of the alkaline storage battery included in the power source unit and the predetermined reference time. The timer unit measures the charging/discharging time during which the alkaline storage battery performs the charge/discharge. The second calculator calculates the additional charge electricity quantity based on the coefficient stored in the storage unit, the predetermined upper-limit depth-of-charge, and the reference time stored in the storage unit. The charge/discharge controller performs a charge of the power source unit with the additional charge electricity quantity, which is calculated by the second calculator, added to the upper-limit depth-of-charge, each time when the charging/discharging time measured by the timer unit reaches the reference time. Therefore, the alkaline storage battery can be almost completely charged without being overcharged, before the memory effect produces significant effects thereon. Thus, it becomes possible to efficiently resolve the memory effect.

In the power supply system described above, it is preferred that the second calculator calculate the additional charge electricity quantity by using an equation, $C=100-(S-KT)$, where K represents the coefficient, S represents the upper-limit depth-of-charge, T represents the reference time, and C represents the additional charge electricity quantity.

According to this configuration, the second calculator calculates the additional charge electricity quantity by using the equation, $C=100-(S-KT)$, where K represents the coefficient, S represents the upper-limit depth-of-charge, T represents the reference time, and C represents the additional charge electricity quantity. Therefore, the additional charge electricity quantity can favorably be obtained based on the coefficient, the upper-limit depth-of-charge, and the reference time.

In the power supply system described above, it is preferred that the upper-limit depth-of-charge S and the reference time T be determined so as to satisfy an inequation, $60<(S-KT)<90$. According to this configuration, the upper-limit depth-of-charge S and the reference time T are determined so as to satisfy an inequation, $60<(S-KT)<90$. $(S-KT)$ corresponds to the depth-of-charge when the additional charge is performed. Therefore, the depth-of-charge when performing the additional charge can be prevented from becoming equal to or greater than 90% or equal to or lower than 60%, so that the additional charge can be carried out at an appropriate depth-of-charge.

In the power supply system described above, it is preferred that the second calculator set an upper limit of the additional charge electricity quantity at 20% of a battery capacity of the alkaline storage battery. According to this configuration, the second calculator sets the upper limit of the additional charge electricity quantity at 20% of the battery capacity of the alkaline storage battery. Thus, the alkaline storage battery can be prevented from being overcharged by the additional charge electricity quantity.

In the power supply system described above, it is preferred that the storage unit store the reference time that is set within a range of 70 to 200 hours and is set at a time in accordance with the characteristics of the memory effect of the alkaline storage battery.

According to this configuration, the storage unit stores the reference time that is set within the range of 70 to 200 hours and is set at a time in accordance with the characteristics of the memory effect of the alkaline storage battery. When a time interval in which the additional charge is performed is less than 70 hours, the alkaline storage battery is overcharged. Thus, the deterioration of the alkaline storage battery is accelerated and the life of the alkaline storage battery is reduced. Further, when the time interval in which the additional charge is performed exceeds 200 hours, the additional charge becomes insufficient, and the effect of resolving the memory effect cannot be exerted fully. Therefore, this configuration can perform the additional charge in a favorable time interval.

In the power supply system described above, it is preferred that the charge/discharge controller perform the additional charge at a current value set within a range of 3 It to 15 It.

According to this configuration, the charge/discharge controller performs the additional charge at the current value set within the range of 3 It to 15 It. Charging at a small current of less than 3 It causes a small change in the battery voltage and the effect of resolving the memory effect is small. Charging at a large current exceeding 15 It increases an inner pressure of the alkaline storage battery, increasing the risk of liquid leakage in the alkaline storage battery. This configuration, therefore, can favorably perform the additional charge.

The present invention can provide an effective charge/discharge control method and an effective power supply system for a power supply system, which has an alkaline storage battery as the power source unit, of an HEV application and the like in which the memory effect should also be considered while avoiding overcharge/over-discharge.

Examples of the present invention are described hereinafter in detail. However, the present invention is not limited to these examples.

EXAMPLES

Example 1

A group of electrodes was created by winding a long positive electrode having a nickel hydroxide as an active material and a long negative electrode having a hydrogen-absorbing alloy as an active material, via a separator made of a sulfonated polypropylene non-woven fabric. After this electrode group was inserted into a 60-mm long tubular battery case having an inner diameter of 30 mm, electrolyte having potassium hydroxide as a main substance was injected into this battery case, and the battery case was then sealed, to obtain a nickel-hydrogen storage battery having a nominal capacity of 6 Ah. Twelve cells of this nickel-hydrogen storage battery were connected in series to obtain the power source unit.

The detector 2, the calculator 3, and the controller 4 were arranged to the power source unit, as shown in FIG. 1. With the upper-limit depth-of-charge SOCt being at SOC 80% and the lower-limit depth-of-charge SOCb being at SOC 20%, each time when the charging/discharging time cumulative total obtained as a result of repeating the charge/discharge at a current value of 12 A reached 100 hours, 1 Ah additional charge was performed at a current value of 30 A adding to the upper-limit depth-of-charge, in a pattern shown in FIG. 3, under a 40° C.-atmosphere. The charge/discharge was repeated under the above conditions until the cumulative total reaches a total of 1500 hours.

Examples 2 to 8

In Examples 2 to 8, the charge/discharge was repeated on the battery in the same manner as in Example 1, except that the current values for performing the additional charge were set at 6, 15, 18, 60, 90, 100, and 120 A.

Examples 9 to 15

In Examples 9 to 15, the charge/discharge was repeated on the battery in the same manner as in Example 1, except that the cumulative total of time spent in the charge/discharge in the intermediate SOC region prior to the additional charge were set at 30, 50, 70, 150, 200, 220, and 300 hours.

Comparative Example 1

In Comparative Example 1, the upper-limit depth-of-charge SOCt was set at SOC 80%, the lower-limit depth-of-charge SOCb was set at SOC 20%, and the charge/discharge was repeated at a current value of 12 A for a total of 1500 hours, based on the same configuration as that of Example 1, without carrying out the additional charge at regular time intervals.

Comparative Example 2

In Comparative Example 2, the charge/discharge was performed on the battery in the same manner as in Example 1, based on the same configuration as that of Example 1, except that the electricity quantity of the additional charge was set at 0.5 Ah.

Comparative Example 3

In Comparative Example 3, the charge/discharge was performed on the battery in the same manner as in Example 1, based on the same configuration as that of Example 1, except that the electricity quantity of the additional charge was set at 1.5 Ah.

The following evaluations were performed on the battery that performed the charge/discharge under the conditions described above.

(Memory Effect)

In order to determine the presence or absence of the memory effect on the charge side, a difference (A1–B1) between a charge end voltage (B1) and a voltage (A1) was obtained after completion of the 1500-hour charge/discharge, the charge end voltage (B1) being obtained when the charge was performed at a constant current until the upper-limit depth-of-charge which is set SOC 80% for example, and the voltage (A1) being a voltage to be judged as an initial upper-limit depth-of-charge which is set SOC 80% for example. When the difference exceeded 450 mV, the memory effect was determined as "significant." When the difference was between 50 mV and 450 mV, the memory effect was determined as "present." When the difference was less than 50 mV, the memory effect was determined as "absent." These results are shown in FIG. 5.

(Electrolyte Leakage)

A piece of litmus paper was placed on the sealed part of the storage battery. When the color of the litmus paper changed to blue, it was determined that liquid leakage was observed due to generation of gas. When the color changed instantly, the liquid leakage was determined as "significant." When the color changed within one minute, the liquid leakage was determined as "present." When the color did not change, the liquid leakage was determined as "absent." These results are shown in FIG. 5.

(Shelf Test)

The difference (A2–B2) between a voltage A2 of the discharged power source unit and a voltage B2 of the power source unit obtained after leaving the storage battery for three days at the 40° C.-atmosphere was obtained. When the difference (A2–B2) exceeded 720 mV, the result was determined as "significant." When the difference (A2–B2) was between 300 mV and 720 mV, the result was determined as "present." When the difference (A2−B2) was less than 300 mV, the result was determined as "absent." These results are shown in FIG. 5.

In Comparative Example 1 in which the additional charge was not performed, the memory effect was significant. In each of the examples of the present invention, on the other hand, the occurrence of the memory effect was prevented. In Comparative Example 2 in which the charged electricity quantity of the additional charge was less than 10% of the battery capacity, the memory effect was significant. In Comparative Example 3 in which the charged electricity quantity of the additional charge exceeds 20% of the battery capacity, electrolyte leakage was confirmed due to an increase in the inner pressure of the battery.

Further, in Examples 2 and 3 in which the current value of the additional charge was less than 3 It, the effect of resolving the memory effect was slightly small. In Examples 7 and 8 in which the current value of the additional charge exceeded 15 It, the memory effect was resolved but the electrolyte leakage was confirmed. Therefore, it is clear that the favorable range of the current value in performing the additional charge is 3 It to 15 It.

In addition, in Examples 9 and 10 in which the cumulative total of time spent in the charge/discharge in the intermediate SOC region prior to the additional charge was less than 70 hours, the memory effect was resolved but a decrease in the battery voltage was confirmed in the shelf test. It is considered that the deterioration of the battery was accelerated due to the excessively frequent additional charge. On the other hand, in Examples 14 and 15 in which the cumulative total of time spent in the charge/discharge in the intermediate SOC region prior to the additional charge exceeded 200 hours, the additional charge was not repeated enough, and the effect of resolving the memory effect was small. Therefore, it is clear that the cumulative total of time spent in the charge/discharge in the intermediate SOC region prior to the additional charge is preferably 70 to 200 hours.

Industrial Applicability

The present invention can realize a power supply system that has no memory effect and is capable of preventing overcharge/overdischarge of a battery. Hence, it is contemplated that the present invention provides high industrial applicability that allows withstanding of tough use—an advantage of an alkaline storage battery—in various applications (HEV application, household cogeneration application, industrial application, etc.), and that the present invention is highly effective.

The invention claimed is:

1. A charge/discharge control method for an alkaline storage battery, the method comprising:
obtaining in advance a coefficient representing characteristics of a memory effect of the alkaline storage battery;
causing the alkaline storage battery to perform a charge/discharge between a lower-limit depth-of-charge, of which a depth-of-charge is set within a range of 10% to 30%, and an upper-limit depth-of-charge, of which a depth-of-charge is set within a range of 70% to 90%;
calculating an additional charge electricity quantity based on the coefficient, the upper-limit depth-of-charge, and a predetermined reference time;
measuring a charging/discharging time during which the alkaline storage battery performs the charge/discharge; and
performing a charge of the alkaline storage battery with the calculated additional charge electricity quantity added to the upper-limit depth-of-charge, each time when the measured charging/discharging time reaches the reference time.

2. The charge/discharge control method for an alkaline storage battery according to claim 1, wherein the additional charge electricity quantity is calculated by using an equation, $C=100-(S-KT)$, where K represents the coefficient, S represents the upper-limit depth-of-charge, T represents the reference time, and C represents the additional charge electricity quantity.

3. The charge/discharge control method for an alkaline storage battery according to claim 2, wherein the upper-limit depth-of-charge S and the reference time T are determined so as to satisfy an inequation, $60<(S-KT)<90$.

4. The charge/discharge control method for an alkaline storage battery according to claim 2, wherein an upper limit of the additional charge electricity quantity is set at 20% of a battery capacity of the alkaline storage battery.

5. The charge/discharge control method for an alkaline storage battery according to claim 1, wherein the reference time is set within a range of 70 to 200 hours and is set at a time in accordance with the characteristics of the memory effect of the alkaline storage battery.

6. The charge/discharge control method for an alkaline storage battery according to claim 1, wherein the charge with the calculated additional charge electricity quantity added to the upper-limit depth-of-charge is performed at a current value set within a range of 3 to 15 It.

7. A power supply system, comprising:
a power source unit that includes an alkaline storage battery;
a first calculator that calculates a depth-of-charge of the power source unit;
a charge/discharge controller that causes the power source unit to perform a charge/discharge between a lower-limit depth-of-charge, of which a depth-of-charge is predetermined within a range of 10% to 30%, and an upper-limit depth-of-charge, of which a depth-of-charge is predetermined within a range of 70% to 90%, based on the depth-of-charge of the power source unit calculated by the first calculator;
a storage unit in which a coefficient representing characteristics of a memory effect of the alkaline storage battery included in the power source unit and a predetermined reference time are stored in advance;
a timer unit that measures a charging/discharging time during which the alkaline storage battery performs the charge/discharge; and
a second calculator that calculates an additional charge electricity quantity based on the coefficient stored in the storage unit, the predetermined upper-limit depth-of-charge, and the reference time stored in the storage unit, wherein
the charge/discharge controller performs a charge of the power source unit with the additional charge electricity quantity, which is calculated by the second calculator, added to the upper-limit depth-of-charge, each time when the charging/discharging time measured by the timer unit reaches the reference time.

8. The power supply system according to claim 7, wherein the second calculator calculates the additional charge electricity quantity by using an equation, $C=100-(S-KT)$, where K represents the coefficient, S represents the upper-limit depth-of-charge, T represents the reference time, and C represents the additional charge electricity quantity.

9. The power supply system according to claim 8, wherein the upper-limit depth-of-charge S and the reference time T are determined so as to satisfy an inequation, $60<(S-KT)<90$.

10. The power supply system according to claim 8, wherein the second calculator sets an upper limit of the additional charge electricity quantity at 20% of a battery capacity of the alkaline storage battery.

11. The power supply system according to claim 7, wherein the storage unit stores the reference time that is set within a range of 70 to 200 hours and is set at a time in accordance with the characteristics of the memory effect of the alkaline storage battery.

12. The power supply system according to claim 7, wherein the charge/discharge controller performs the charge with the calculated additional charge electricity quantity added to the upper-limit depth-of-charge at a current value set within a range of 3 to 15 It.

* * * * *